United States Patent [19]

Takahashi

[11] Patent Number: 5,398,224

[45] Date of Patent: Mar. 14, 1995

[54] OPTICAL DISK REPRODUCING APPARATUS HAVING A TRACK JUMP CONTROL MEANS

[75] Inventor: Hiroyuki Takahashi, Tokorozawa, Japan

[73] Assignee: Pioneer Electronic Corporation, Tokyo, Japan

[21] Appl. No.: 119,825

[22] Filed: Sep. 13, 1993

Related U.S. Application Data

[63] Continuation of Ser. No. 640,453, Jan. 11, 1991, abandoned.

[30] Foreign Application Priority Data

May 28, 1990 [JP] Japan .................. 2-137444

[51] Int. Cl.⁶ ........................... G11B 7/085
[52] U.S. Cl. ................ 369/44.28; 369/44.29; 369/44.35; 369/44.25
[58] Field of Search ............ 369/44.32, 44.25, 44.27, 369/44.28, 44.29, 44.35, 44.41, 124

[56] References Cited

U.S. PATENT DOCUMENTS

| | | | |
|---|---|---|---|
| 4,495,608 | 1/1985 | Kumura et al. | 369/98 |
| 4,805,163 | 2/1989 | Ohnuki | 369/44.32 |
| 4,817,073 | 3/1989 | Suzuki | 369/44.28 |
| 4,926,405 | 5/1990 | Hangai et al. | 369/32 |
| 4,930,114 | 5/1990 | Tateishi | 369/124 |
| 5,050,146 | 9/1981 | Richgels et al. | 369/44.28 |

*Primary Examiner*—Aristotelis Psitos
*Assistant Examiner*—Muhammad N. Edun
*Attorney, Agent, or Firm*—Sughrue, Mion, Zinn, Macpeak & Seas

[57] ABSTRACT

An optical disk reproducing apparatus having a brake device for emitting a brake signal includes a track jump control device adapted to inhibit, during a track jump operation, the operation of the brake device until a predetermined period has elapsed starting from a time not earlier than the termination of the emission of the brake signal. Thus, the brake device does not operate until the emission of the brake signal has been terminated, so that, if there is some defect in the target track to which the pickup is to be jumped, the brake device does not malfunction. Accordingly, the drive device can reliably effect a track jump even if the target track of the track jump has some defect. Further, the brake device operates after the above-mentioned predetermined period has elapsed, so that, if a track stray happens to occur due to some defect in the target track, the effect of such a defect can be reduced.

5 Claims, 4 Drawing Sheets

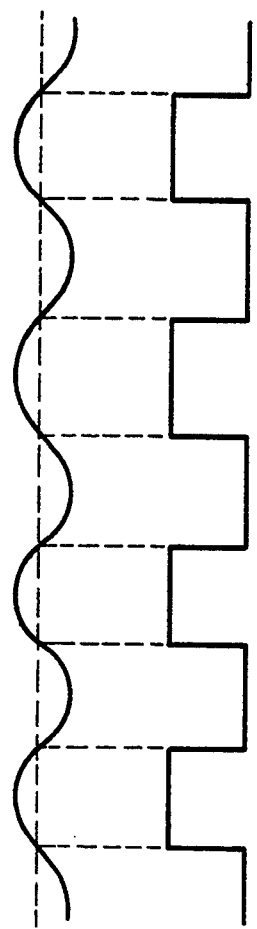
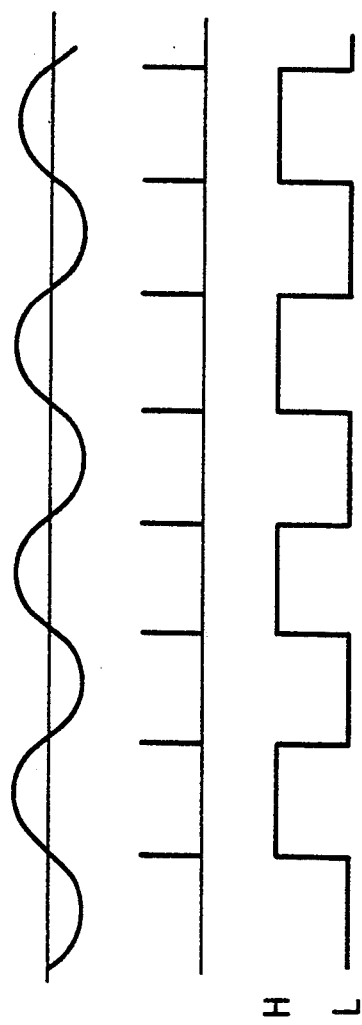
FIG. 3(a) RF SIGNAL
FIG. 3(b) ENVELOPE SIGNAL
FIG. 3(c) COMPARISON SIGNAL
FIG. 3(d) TRACKING ERROR SIGNAL
FIG. 3(e) ZERO-CROSS DETECTION SIGNAL
FIG. 3(f) CONTROL SIGNAL

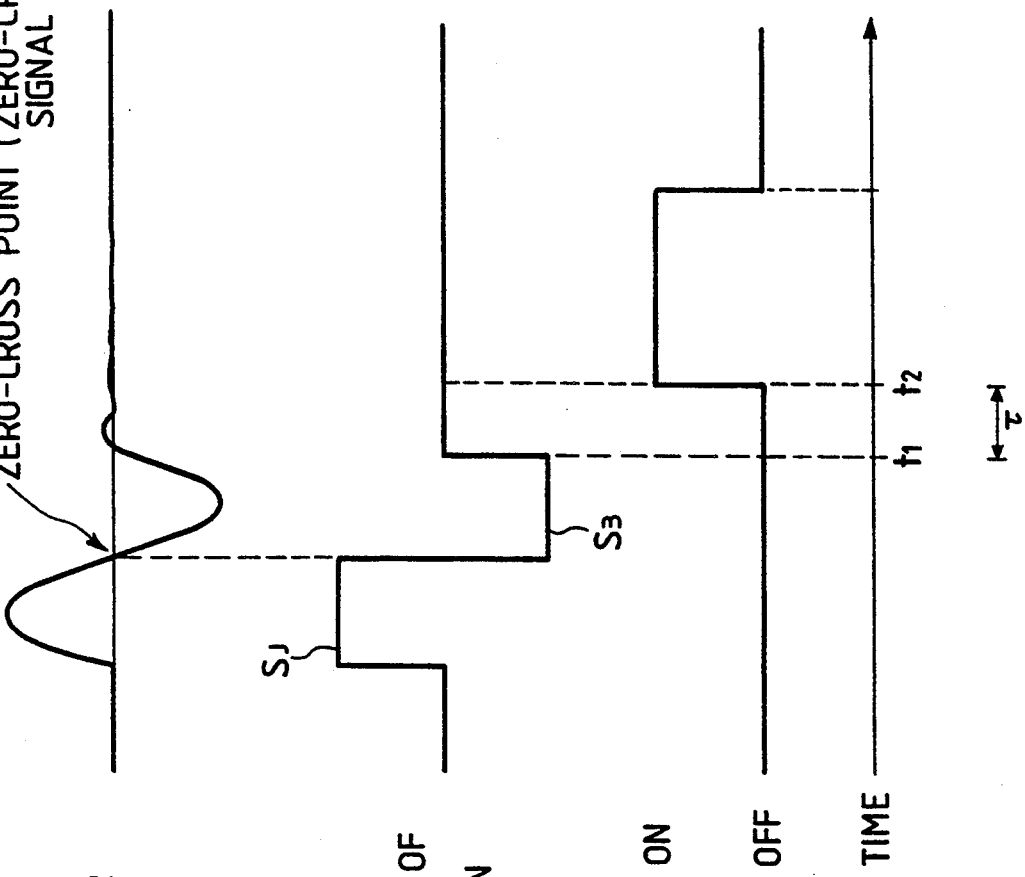

OPTICAL DISK REPRODUCING APPARATUS HAVING A TRACK JUMP CONTROL MEANS

This is a continuation of application Ser. No. 07/640,453, filed Jan. 11, 1991, now abandoned.

BACKGROUND OF THE INVENTION

This invention relates to an optical disk reproducing apparatus for reproducing information recorded on an optical disk, such as a CD (compact disk) or an LVD (laser vision disk), and more particularly, to a system for avoiding a so-called track stray upon effecting a track jump.

In an optical disk reproducing apparatus, the tracing position is often forcibly moved from one track to another. This movement of the tracing position is generally called a track jump. A track jump is effected, for example, when a user of a CD player is trying to locate the beginning of a piece of music in a CD player. The track jump is of two types: a one-track jump is effected by supplying a jump pulse to the tracking actuator; and a multi-track jump is effected by moving the optical pickup itself by means of a slider. In the case of a one-track jump, the jump pulse is composed of a pulse for moving the focusing position of the objective lens and a brake pulse for diminishing the acceleration effected by the above-mentioned pulse.

A problem with the track jump is a phenomenon called a "tracking stray". This is a phenomenon in which the actuator fails to stop at the destination track and instead moves onto some other tracks. A tracking stray occurs when the setting of the tracking actuator after a track jump is poorly made. Conventional optical disk reproducing apparatuses have been equipped with a circuit called a "brake circuit" for avoiding such a track stray. The brake circuit is a circuit for improving the setting of the actuator which drives the pickup when effecting a track jump. The brake circuit is designed to operate from the start of a track jump to the termination thereof, at predetermined time intervals.

The operation of this brake circuit will now be described in detail.

As disclosed in Japanese Patent Laid-Open No. 57-120276, the brake circuit utilizes the fact that the phase relationship between a signal obtained by extracting the envelope of a RF (radio frequency) signal reproduced by the pickup (hereinafter referred to as the "envelope signal") and a tracking error signal differs depending on the direction in which the light spot for signal reading is moved. The above-mentioned phase relationship when the light spot for signal reading moves radially across a track from the inside to the outside is shifted by 90° with respect to the phase relationship when the light spot moves across the track from the outside to the inside.

The operation of the brake circuit is as follows: in the area where the tracking servo loop operates as a negative feedback loop, the tracking servo loop is set in a closed state, and, in the area where the tracking servo loop operates as a positive feedback loop, the tracking servo loop is set in an open state. More specifically, when, during a track jump operation, the light spot for signal reading moves from the center of one track and passes across the line which is substantially at the center of an inter-track section (section between two adjacent tracks), the tracking servo loop is set in the closed state, and, when the light spot for signal reading moves from the line which is substantially at the center of an inter-track section and passes across the center of a track, the tracking servo loop is set in the open state. This helps to diminish the relative speed of the light spot for signal reading with respect to the optical disk each time this light spot moves across a track.

In other words, the actuator which drives the pickup is braked each time the light spot for signal reading moves across a track. Accordingly, the setting of the actuator is improved, thereby enabling it to jump to a desired track.

A conventional optical disk reproducing apparatus, however, has the following problems: If there is some defect in the target or object track to which the pickup is to be jumped, the RF signal is not emitted in the normal manner, with the result that the comparison signal is not emitted in the normal manner, either. Thus, there is a problem that the brake circuit might set the tracking servo loop in an open state, when it should instead be set in the closed state, or vice versa, thereby causing a track stray.

SUMMARY OF THE INVENTION

It is an object of this invention to provide an optical disk reproducing apparatus, use of which does not involve a track stray even when there is some defect in the target track.

In a specific form of this invention, there is provided an optical disk reproducing apparatus comprising: a pickup adapted to apply a light beam to a track formed on an optical disk being rotated by a driving means so as to form a light spot thereon and to emit a read signal that is obtained from the reflection of the light beam; a drive means including an actuator and adapted to drive the pickup; a tracking error detecting means adapted to emit a tracking error detection signal on the basis of the read signal from the pickup; a tracking servo loop including a servo means and adapted to perform a tracking servo operation on the basis of the tracking error signal; a brake means adapted to open or close the tracking servo loop during a track jump operation in accordance with the read signal and the tracking error signal; and a track jump control means adapted to effect a track jump by supplying a jump signal and a brake signal to the drive means on the basis of a jump instruction signal from outside, the above-mentioned track jump control means being adapted to inhibit, during a track jump operation, the operation of the brake means until a predetermined period has elapsed starting from a time not earlier than the termination of the emission of the brake signal.

In another form of this invention, the above-mentioned brake means includes: a zero-cross detection means adapted to detect a zero-cross point of the above-mentioned tracking error signal, and to emit a zero-cross detection signal; a detection means adapted to detect a signal which is generated when the above-mentioned light spot moves across the above-mentioned track and which has a phase advance or a phase delay of a quarter period with respect to the above-mentioned tracking error signal, and to emit a detection signal; a comparison means adapted to compare the level of the above-mentioned detection signal at the above-mentioned zero-cross point with the level of a predetermined reference signal on the basis of the above-mentioned zero-cross detection signal, and to emit a comparison signal; and a servo loop opening/closing control means which controls the above-mentioned tracking servo loop on the basis of the above-mentioned comparison signal in such a manner that, when the level of the above-mentioned detection signal is higher than the level of the reference signal, the tracking servo loop is closed at the zero-cross point, and that, when the level of the above-mentioned detection signal is lower than the level of the reference signal, the tracking servo loop is opened at the zero-cross point.

In accordance with this invention, the pickup applies a light beam to a track formed on an optical disk being rotated by a driving means, and emits a read signal obtained from the reflection of this light beam.

The tracking error detection means emits a tracking error signal on the basis of the read signal from the pickup.

The tracking servo loop performs a tracking servo operation on the basis of the tracking error signal.

The track jump control means effects a track jump by supplying a jump signal and a brake signal to the drive means on the basis of an externally supplied track jump instruction signal. Further, during a track jump operation, the track jump control means inhibits the operation of the brake means until a predetermined period has elapsed starting from a time not earlier than the termination of the emission of the brake signal.

Thus, the brake means does not operate until the emission of the brake signal has been completed, so that, if there is some defect in the target track to which the pickup is to be jumped, the brake means is prevented from malfunctioning. Accordingly, the drive means can reliably perform a track jump even if the target track has some defect. Further, the brake means operates after the above-mentioned predetermined period has elapsed, so that, if a track stray happens to occur due to some defect in the target track, the effect of such a defect can be reduced.

BRIEF DESCRIPTION OF THE DRAWINGS

FIGS. 3(a) to 3(f) are diagrams illustrating the operation of the apparatus of this invention; and FIGS. 4(a) to 4(c) are detailed diagrams illustrating the operation of the apparatus of this invention.

DESCRIPTION OF THE PREFERRED EMBODIMENTS

Figure 1:
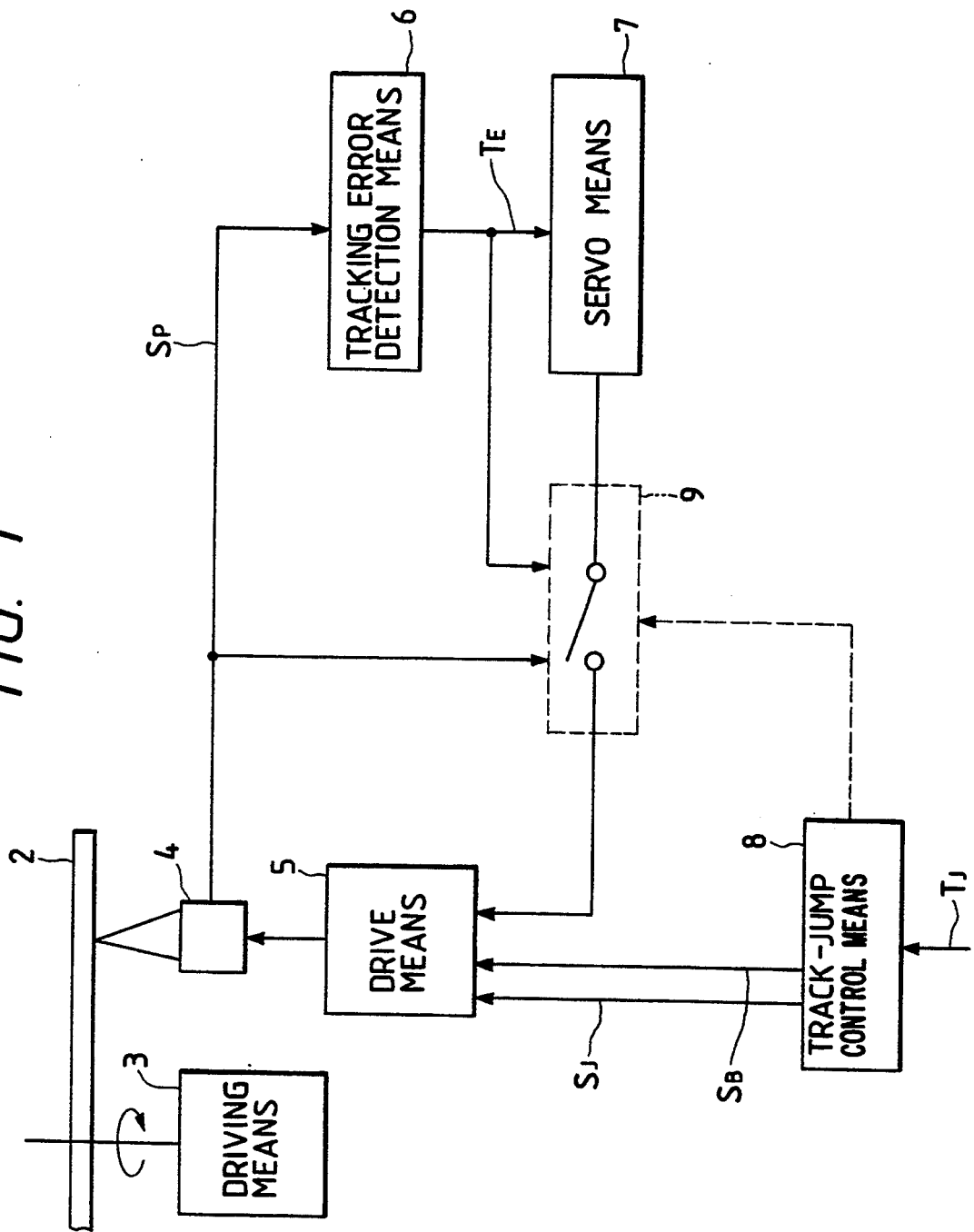
FIG. 1 is a diagram illustrating the principle of this invention.

An optical disk reproducing apparatus in accordance with an embodiment of this invention will now be described in detail with reference to the accompanying drawings.

The apparatus shown includes a pickup 4 adapted to apply a light beam to a track and to emit a read signal $S_P$ obtained from the reflection of this light beam, a drive means 5 having an actuator and adapted to drive the pickup 4, a tracking error detection means 6 adapted to emit a tracking error signal $T_E$ on the basis of the read signal $S_P$ from the pickup 4, a tracking servo loop having a servo means 7 and adapted to perform a tracking servo operation on the basis of the tracking error signal $T_E$, a brake means 9 adapted to open and close the tracking servo loop on the basis of the read signal $S_P$ and the tracking error signal $T_E$ upon performing a track jump operation, and a track jump control means 8 adapted to effect a track jump by supplying a jump signal $S_J$ and a brake signal $S_B$ to the drive means 5 on the basis of a track jump instruction signal $T_J$ from outside, the track jump control means 8 inhibiting, during a track jump operation, the operation of the brake means 9 until a predetermined period has elapsed starting from a time not earlier than the termination of the emission of the brake signal $S_B$.

Figure 2:
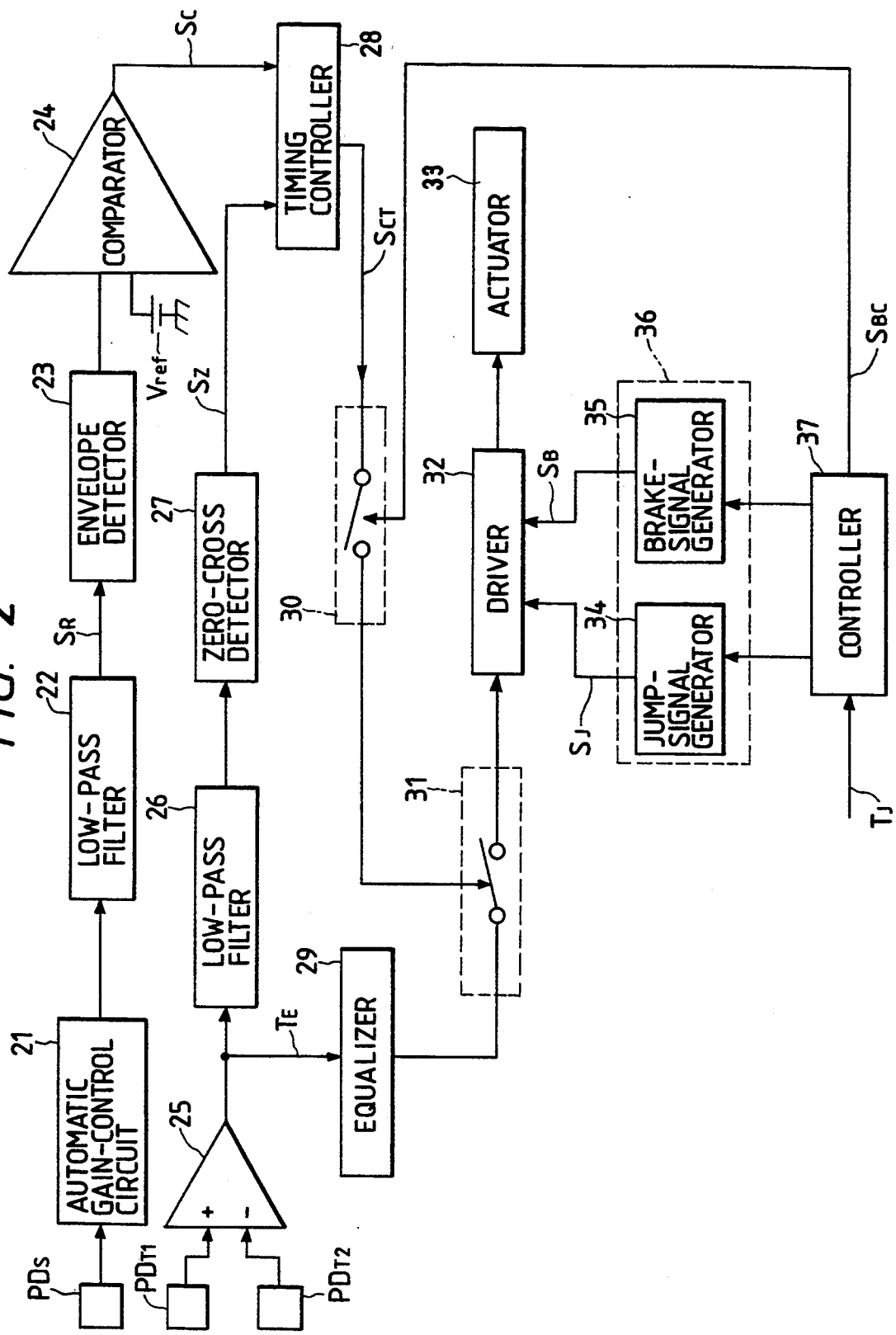
FIG. 2 is a block diagram showing an embodiment of this invention.

The block diagram of FIG. 2 shows an embodiment of this invention.

The reflection of the light spot for signal reading is converted to an electrical signal by a photodetector $PD_S$, and is amplified by an automatic gain control circuit 21. The amplified electrical signal is emitted as a RF signal $S_R$ by a low-pass filter 22. The envelope of this RF signal $S_R$ is extracted by an envelope detector 23. The voltage level of the envelope thus detected is compared with that of a reference signal $V_{ref}$ by a comparator 24, and the result of the comparison is supplied to a timing controller 28 as a comparison signal $S_C$.

The reflection of the light spot for tracking is converted to electrical signals by corresponding photodetectors $PD_{T1}$ and $PD_{T2}$ and is emitted as a tracking error signal $T_E$ by a differential amplifier 25. This tracking error signal $T_E$ is supplied through an equalizer 29 for frequency-phase compensation and a servo loop switch 31 to a driver 32 for driving an actuator 33 for tracking.

Further, noise components are cleared off from the tracking error signal $T_E$ by a low-pass filter 26 and the cleared off signal is then supplied to a zero-cross detector 27. In the zero-cross detector 27, a zero-cross point of the tracking error signal $T_E$ is detected, and a zero-cross signal is emitted for each zero-cross timing.

The timing controller 28 is equipped, for example, with a D-type flip-flop circuit. When the comparison signal $S_C$ and the zero-cross detection signal $S_Z$ are supplied to this timing controller 28 as a data signal and a clock signal, respectively, a control signal $S_{CT}$ for turning the servo loop switch 31 ON and OFF is emitted from the Q-terminal thereof. Thus, the timing controller 28 and the servo loop switch 31 acts as a brake circuit.

The apparatus shown further includes a controller 37 and a track jump control section 36, which is composed of a jump signal generator 34 and a brake signal generator 35. When a track jump instruction signal $T_J$ is supplied to the controller 37 from outside, the controller 37 causes the jump signal generator 34 of the track jump control section 36 to generate a jump signal $S_J$ and supplies it to the driver 32, thereby starting a track jump operation. At the same time, the controller 37 supplies a brake control signal $S_{BC}$ to the brake control switch 30 so that the control signal $S_{CT}$ may not be supplied to the servo loop switch 31, thereby constantly keeping the servo loop switch in the open state, i.e., inhibiting it from acting as a brake circuit. While monitoring the track jump operation, the controller 37 causes a brake signal to be supplied to the actuator 33, thereby decelerating the actuator 33. When the emission of the brake signal $S_B$ has been terminated and a predetermined period has further elapsed, the controller 37 turns the brake control switch 30 ON by the brake control signal $S_{BC}$, thereby allowing the control switch $S_{CT}$ to be supplied from the timing controller 28 to the servo loop switch 31.

Afterwards, the controller 37 and the servo switch 31 operate as a brake circuit, reliably leading the light spot for signal reading to the target track.

Next, the operation of the optical disk reproducing apparatus of this invention will be described in more detail with reference to FIG. 3.

When a RF signal as shown in FIG. 3(a) is emitted from the pickup, an envelope signal as shown in FIG. 3(b) is extracted by the envelope detector. This envelope signal is supplied to the comparator, where it is compared with the reference signal $V_{ref}$. When the voltage level of the envelope signal is higher than that of the reference signal $V_{ref}$, an "H" level signal is emitted as a comparison signal, and, when the voltage level of the envelope signal is lower than that of the reference signal $V_{ref}$, an "L" level signal is emitted as a comparison signal (see FIG. 3(c)).

The output signal to the differential amplifier 25, i.e., the tracking error signal $T_E$, is emitted as a signal whose phase is shifted by 90° with respect to the phase of the above-mentioned envelope signal, as shown in FIG. 3(d). The zero-cross points of this tracking error signal $T_E$ are detected by a zero-cross detector 27, and zero-cross signals as shown in FIG. 3(e) are supplied to the timing control circuit.

The timing controller 28 checks the level of the comparison signal $S_C$ at each zero-cross point. When the level of the comparison signal at a zero-cross point is the "H" level, the control signal $S_{CT}$ is set at the "H" level, and the tracking servo loop is set in the closed state. When the level of the comparison signal at this zero-cross point is the "L" level, the control signal $S_{CT}$ is set at the "L" level, and the tracking servo loop is set in the open state.

Next, the operation of the apparatus of this invention will be described in more detail in connection with the case where a one-track jump is effected.

When a one-track jump instruction signal is supplied from one side as the track jump instruction signal $T_J$, the controller 37 causes the jump signal generator 34 to supply a jump signal $S_J$ to the driver 32 (see FIG. 4(b)). This causes the driver 32 to drive the actuator 33, thereby starting a track jump operation.

Afterwards, the tracking error signal $T_E$ zero-crosses (see FIG. 4(a)), and, when a zero-cross detection signal is emitted from the zero-cross detector 27, the controller 37 causes the brake signal generator 35 to supply a brake signal $S_B$ to the driver 32 (see FIG. 4(b)), thereby causing the driver 32 to brake the actuator.

Afterwards, the controller 37 makes a judgement as to whether a predetermined period $\tau$ has elapsed starting from the termination of the emission of the brake signal $S_B$ (time t1), as shown in FIG. 4, or not. If the predetermined time $\tau$ has elapsed (time t2) for confirmation that the actuator arrived at the target track and the normal signal on the track is picked up, the brake control switch 30 is turned ON, and the control signal $S_{CT}$ of the timing controller 28 is supplied to the servo loop switch 31. Thus, the timing controller 28 and the servo loop switch 31 functions as a brake circuit, opening or closing the servo loop.

Thus, when effecting a track jump, the brake circuit does not operate until the brake pulse signal $S_B$ has been emitted, so that no track jump failure due to malfunction of the tracking servo loop occurs. Further, if, after the emission of the brake pulse signal, a track stray occurs due to some defect in the jumping target track, etc., the brake circuit operates when a predetermined period has elapsed after the emission of the brake pulse signal so as to effect braking, thereby reducing the effect of the track stray.

In accordance with this invention, braking is effected after the termination of a track jump, so that, even if the RF signal is not emitted in the normal manner due to some defect in the jumping target track, the tracing position of the pickup can be correctly brought onto the target track.

What is claimed is:

1. An optical disk reproducing apparatus comprising:
   a pickup for applying a light beam to a track formed on an optical disk being rotated so as to form a light spot thereon and to obtain a read signal based on a light beam reflected by the optical disk;
   a drive means for driving said pickup in a radial direction of the optical disk;
   a tracking error detecting means for producing a tracking error signal on the basis of the read signal;
   a tracking servo means, provided in a tracking servo loop, for performing a tracking servo operation on the basis of the tracking error signal;
   a track jump control means for supplying a track jump signal to said drive means so as to transfer the pickup to a desired position, the track jump signal including a jump pulse signal of a first polarity and a brake pulse signal, following the jump pulse signal, of a second polarity opposite to the first polarity;
   a brake means for repeatedly opening and closing the tracking servo loop during a track jump operation in accordance with the read signal and the tracking error signal; and
   a brake control means for counting a time period starting from a time when the brake pulse signal returns to zero and for activating the brake means when the time period counted becomes equal to a predetermined, constant time period.

2. An apparatus according to claim 1, wherein said brake means comprises:
   a zero-cross detection means for detecting a zero-cross point of the tracking error signal and outputting a zero-cross detection signal;
   a detection means for detecting a signal which is generated when the light spot moves across the track and which has a phase advance or a phase delay of a quarter period with respect to the tracking error signal, and outputting a detection signal;
   a comparison means for comparing the level of the detection signal at the zero-cross point with a level of a predetermined reference signal on the basis of the zero-cross detection signal, and outputting a comparison signal; and
   a servo loop switching means for controlling the tracking servo loop on the basis of the detection signal so that the servo loop is closed when the level of the detection signal is higher than the level of the reference signal and the servo loop is open at the zero-cross point when the level of the detection signal is lower than the level of the reference signal.

3. An apparatus according to claim 2, wherein said servo loop switching means comprises a flip-flop circuit to which the comparison signal is supplied as a data signal and the zero-cross detection signal is supplied as a clock signal.

4. An apparatus according to claim 1, wherein said brake control means comprises a first switch for opening and closing the tracking servo loop and a second switch for supplying and cutting off a control signal for opening and closing the tracking servo loop to the first switch.

5. A method for performing a tracking jump operation, in response to a jump instruction including a jump target information, on an optical pickup that applies a light beam onto a track formed on an optical disk and that forms a light spot thereon under control of a tracking servo loop, said method comprising the steps of:

receiving the jump instruction;

producing a track jump signal in accordance with the jump target information, said track jump signal including a jump pulse signal of a first polarity and a brake pulse signal following the jump pulse signal and of a second polarity opposite to the first polarity;

opening the tracking servo loop and keeping the loop in an open state;

moving the optical pickup in a radial direction of the optical disk in response to the jump pulse signal;

decelerating said optical pickup in response to the brake pulse signal;

counting a time period starting from a time when the brake pulse signal returns to zero; and repeatedly opening and closing the tracking servo loop when the time period counted becomes equal to a predetermined constant time period.

* * * * *